(12) United States Patent
Knecht et al.

(10) Patent No.: US 7,589,522 B2
(45) Date of Patent: Sep. 15, 2009

(54) METHOD AND APPARATUS FOR CONTACTLESS DETECTION OF THE ROTATIONAL ANGLE OF A ROTATABLE ELEMENT

(75) Inventors: Gerhard Knecht, Iffezheim (DE); David Fricker, Kaltenhouse (FR)

(73) Assignee: Robert Bosch GmbH, Stuttgart (DE)

( * ) Notice: Subject to any disclaimer, the term of this patent is extended or adjusted under 35 U.S.C. 154(b) by 281 days.

(21) Appl. No.: 11/814,206

(22) PCT Filed: Feb. 6, 2006

(86) PCT No.: PCT/EP2006/050697

§ 371 (c)(1), (2), (4) Date: Jul. 18, 2007

(87) PCT Pub. No.: WO2006/094866

PCT Pub. Date: Sep. 14, 2006

(65) Prior Publication Data

US 2008/0129285 A1 Jun. 5, 2008

(30) Foreign Application Priority Data

Mar. 10, 2005 (DE) .................. 10 2005 011 099

(51) Int. Cl.
*G01B 7/30* (2006.01)

(52) U.S. Cl. .................... 324/207.21; 324/207.25; 324/207.16

(58) Field of Classification Search ............... None
See application file for complete search history.

(56) References Cited

U.S. PATENT DOCUMENTS 5,955,881 A * 9/1999 White et al. ............ 324/207.2
2002/0053903 A1 5/2002 Kempe

FOREIGN PATENT DOCUMENTS

DE 100 17 061 A1 10/2001
JP 2004-85482 3/2004

* cited by examiner

*Primary Examiner*—Jay M Patidar
(74) *Attorney, Agent, or Firm*—Ronald E. Greigg

(57) ABSTRACT

The invention relates to a device and a method for determining the rotational angle of a rotatable element in a non-contact manner, the device including at least one magnetoresistive sensor element which emits at least one first signal for determining a rotational angle of the rotatable element in a first region. A plunger core and a coil move in relation to each other in the axial direction of a shaft according to the rotary movement of the shaft, the coil emitting another signal relating to the modification of the coil inductance, such that rotational angles beyond the first region can be clearly determined in association with the first signal.

19 Claims, 4 Drawing Sheets

METHOD AND APPARATUS FOR CONTACTLESS DETECTION OF THE ROTATIONAL ANGLE OF A ROTATABLE ELEMENT

CROSS-REFERENCE TO RELATED APPLICATION

This application is a 35 USC 371 application of PCT/EP 2006/050697 filed on Feb. 6, 2006.

BACKGROUND OF THE INVENTION

1. Field of the Invention

The invention relates to an apparatus and a method for contactless detection of the rotational angle of a rotatable element.

2. Description of the Prior Art

From German Patent Disclosure DE-A 100 17 061, an arrangement for contactless detection, in particular, of the rotational angle of a rotatable element is known, in which by evaluating magnetically variable properties of a sensor array with at least two sensor elements, a magnetic field intensity generated or varied by the rotatable element is detectable in an evaluation circuit and used for ascertaining the rotary position; one sensor element works by using the magnetoresistive effect, and at least two further sensor elements operate by utilizing the Hall effect, and the evaluation circuit serves the purpose of logical linkage of the three sensor signals thus obtained.

From Japanese Patent Disclosure JP-A 2004085482, an apparatus for detecting rotational angles over more than one revolution of a rotating shaft is also known it includes a first means for angle detection, a conversion means for converting a rotating motion into a longitudinal motion, and a further means for detecting a linear position of the rotating shaft by means of a spacing measurement.

SUMMARY AND ADVANTAGES OF THE INVENTION

Compared to the prior art, the apparatus and the method according to the invention for contactless detection of the rotational angle of a rotatable element have the advantage that because of increased resolution, unambiguous rotational angles can be detected or determined with very high precision and enhanced invulnerability to malfunction over a plurality of revolutions of the rotatable element. To that end, besides at least one magnetoresistive sensor element which outputs at least one magnetoresistive sensor signal for detecting a rotational angle of the rotatable element in a first range, the apparatus of the invention includes a plunger core and a coil, which move relative to one another in the axial direction of a shaft as a function of the rotary motion of the shaft; the coil outputs a coil signal pertaining to the change in the coil inductance, so that in combination with the magnetoresistive sensor signal, rotational angles beyond the first range can be unambiguously detected. Ascertaining the coil inductance moreover has the advantage that the unambiguous rotational angles are stored mechanically and thus even if the power supply is shut off, a mechanical adjustment of the rotatable element presents no problem, since the current position of the plunger core inside the coil is immediately available again once the power supply is resumed.

In an advantageous embodiment, it is provided that the position of the plunger core inside the coil is detectable by means of a resonant circuit, whose resonant frequency is dependent on the coil inductance. In this way, rotational angle detection that is highly secure against malfunction is assured, and the position resolution can be enhanced virtually arbitrarily as a function of the sampling rate during the measurement of the period length associated with the resonant frequency.

In a preferred way, there is a thread on the shaft and/or the plunger core, and the shaft is a component of the rotatable element. Thus the plunger core can move in the axial direction relative to the coil upon a rotary motion of the shaft. In an alternative feature, however, it may also be provided that the shaft is connected to the rotatable element via a gear. In this way, it is possible to keep the structural length of the shaft compact or to dispose the shaft in such a way that a favorable structural form of the entire apparatus for later installation is obtained.

BRIEF DESCRIPTION OF THE DRAWINGS

The invention will be described more fully herein below, with reference to the drawings, in which.

DESCRIPTION OF THE PREFERRED EMBODIMENTS

Figure 1:
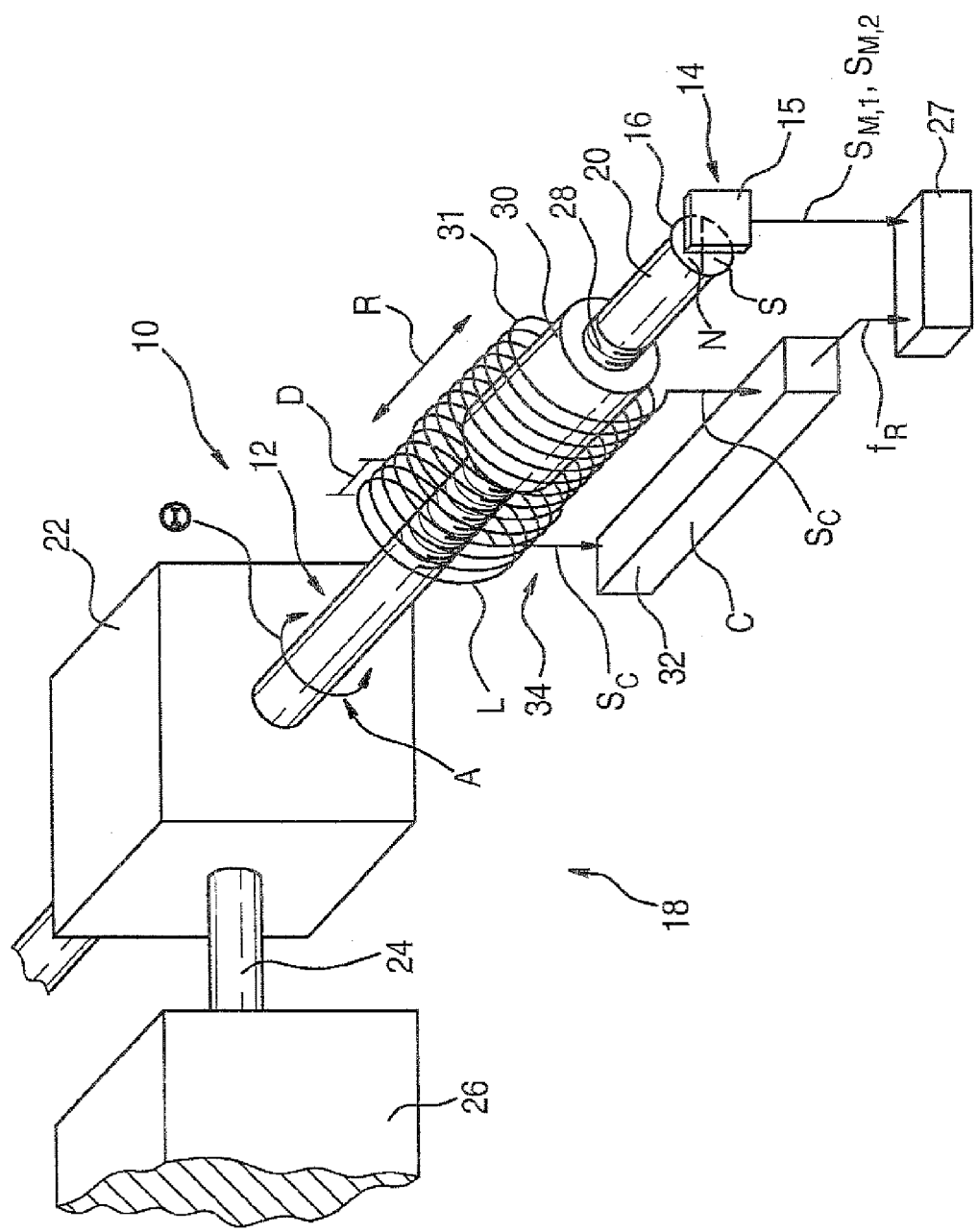
FIG. 1 is a schematic illustration of a first exemplary embodiment of the apparatus of the invention.

In FIG. 1, a schematic illustration is shown of a first exemplary embodiment of the apparatus 10 of the invention for contactless detection of the rotational angle of a rotatable element 12, having a magnetoresistive sensor element 14 which outputs two signals $S_{M,1}$ and $S_{M,2}$ for detecting a rotational angle $\Theta$ of the rotatable element 12. For triggering the magnetoresistive sensor element 14, which is embodied in this case as an anisotropic, magnetoresistive (AMR) sensor 15, a permanent magnet 16 with a north pole N and a south pole S is used. Instead of a permanent magnet 16 with only two alternating poles (a pair of poles), it is naturally equally possible to use permanent magnets with markedly more pairs of poles. It is equally possible, instead of the AMR sensor 15, to use other magnetoresistive sensor elements. Below, however, for the sake of simplicity an AMR sensor 15 will always be assumed.

Figure 3:
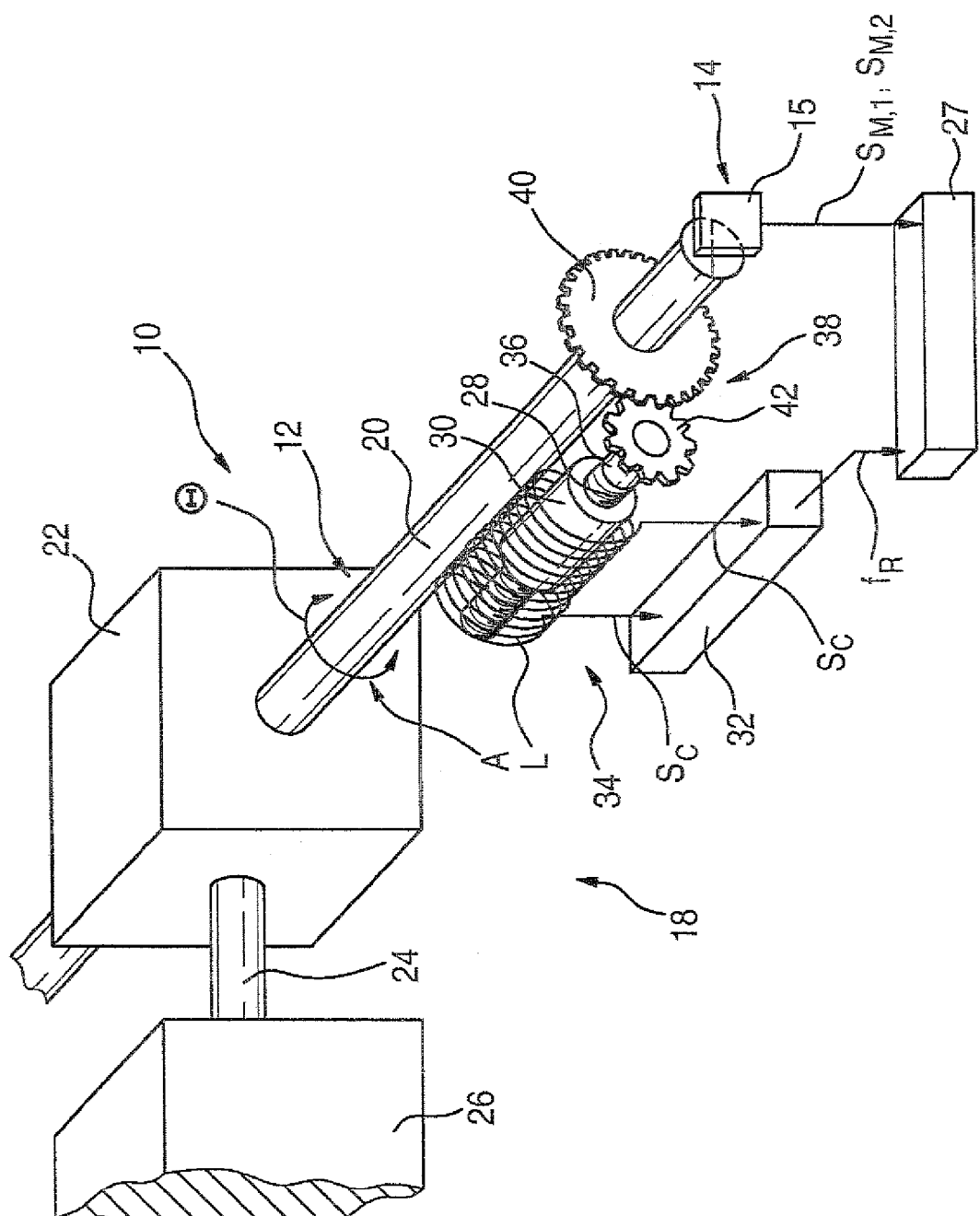
FIG. 3 is a schematic illustration of a second exemplary embodiment of the apparatus of the invention.
Figure 4:
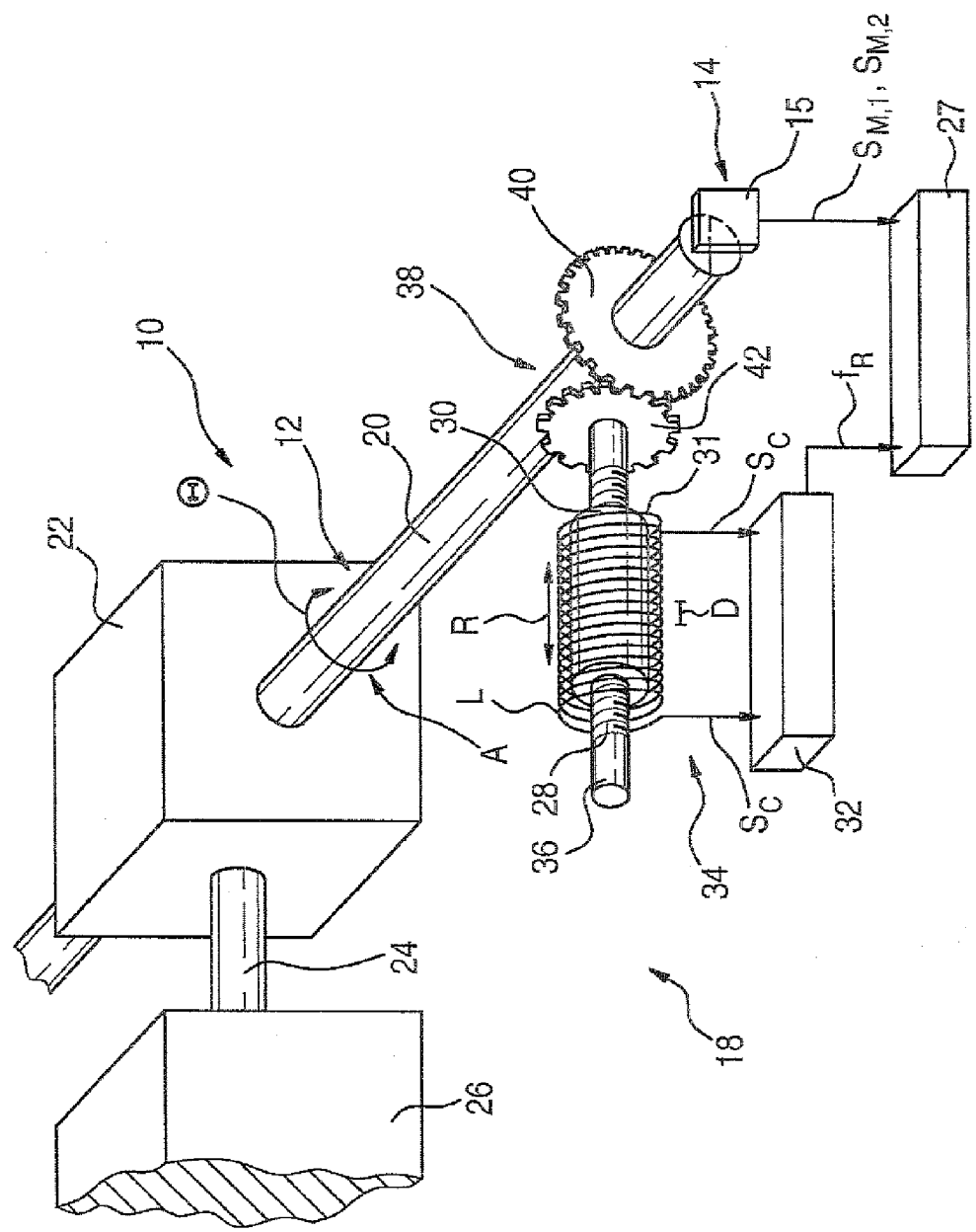
FIG. 4 is a schematic illustration of a third exemplary embodiment of the apparatus of the invention.

The rotatable element 12, in the exemplary embodiments shown here in FIGS. 1, 3 and 4, is embodied as an electronic power steering drive 18, in which a shaft 20, which is connected to an electric motor 26 via a drive unit 22, for instance a gear for speed reduction, not further described here, and a drive shaft 24.

Figure 2A:
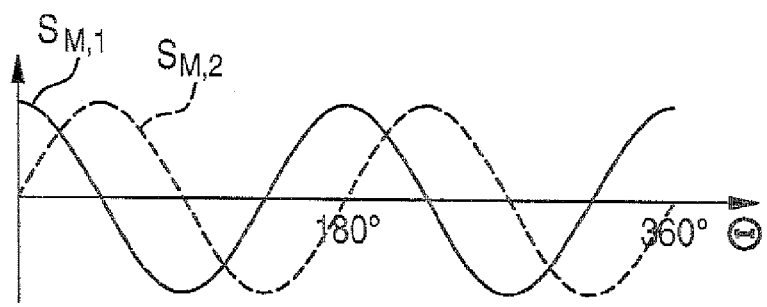
FIGS. 2a and 2b are graphs of a first signal output by a magnetoresistive sensor element and of a resonant frequency, generated by a resonant circuit, as a function oil the rotational angle and of the number of revolutions of a shaft associated with a rotatable element.

In the first exemplary embodiment in FIG. 1, the shaft 20 is a component of the rotatable element 12. By means of the AMR sensor 15 and the permanent magnet 16 associated with it, rotational angles $\Theta$ in a first range A from 0° to 180° can be detected exactly and unambiguously. The AMR sensor 15 outputs the signals $S_{M,1}$ and $S_{M,2}$, which extend in sine wave and cosine wave fashion as a function of the rotational angle $\Theta$, as shown in FIG. 2a and carries them onward to an evaluation circuit 27. It can be seen from the course of the signals $S_{M,1}$ and $S_{M,2}$ that a periodicity of 180° is present, and thus rotational angles Θ of more than 180° can no longer be unambiguously detected using only a single AMR sensor. Hence there is no need for a further device for unambiguously determining rotational angles Θ outside this first range A, or in other words angles of more than 180°. According to the invention, for that purpose, a thread 28 is provided on the shaft 20, and with it, as a function of the rotary motion of the shaft 20, a plunger core 30, which may have a corresponding thread, not shown, or mandrel, also not shown, is moved in the axial direction R of the shaft 20 relative to a coil 31. Advantageously, the plunger core 30 comprises a ferromagnetic material, such as iron, neodymium, AlNiCo (an aluminum-nickel-cobalt alloy), or the like.

If the shaft 20 now rotates by a certain amount, then the plunger core 30, because of the thread 28, moves in the axial direction R inside the coil 31 and causes a change in the coil inductance L of the coil. This change is forwarded by means of a further signal $S_c$ to a capacitor 32 of capacitance C, which together with the coil inductance L forms a resonant circuit 34 with the resonant frequency $f_R$; the varying coil inductance L also causes a change in the resonant frequency $f_R$. Instead of a single capacitor 32 of capacitance C, naturally single components or a plurality of different components may be provided that in conjunction with the coil inductance L bring about a characteristic resonant frequency $f_R$ of the resultant series and/or parallel resonant circuit. Hereinafter, however, the assumption will always be an LC resonant circuit 34.

Figure 2B:
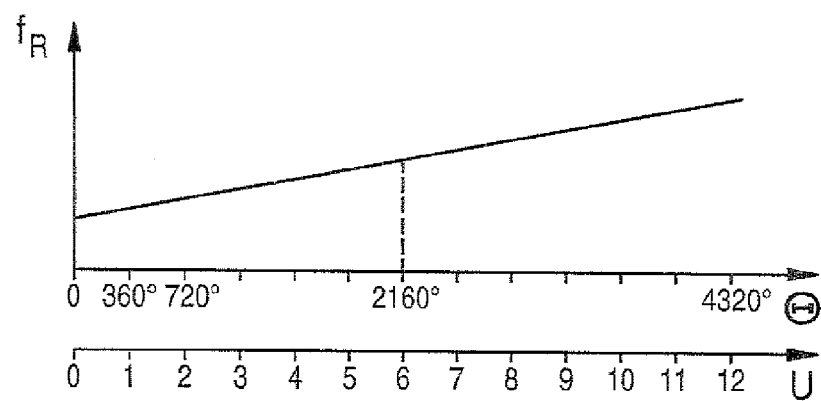

It can be seen in FIG. 2b that the resonant frequency $f_R$ of the resonant circuit 34 depends linearly on the rotational angle Θ or the number U of revolutions and thus on the depth to which the plunger core 30 plunges into the coil 31. If the AMR sensor signals $S_{M,1}$ and $S_{M,2}$ are now combined in the evaluation circuit 27 with the information about the resonant frequency $f_R$ of the resonant circuit, unambiguous detection of the rotational angle beyond the first range A and furthermore beyond one full revolution of the shaft 20 is possible. As a result of this provision, there is in particular the advantage of an exact mechanical storage of the number U of revolutions of the shaft 20 as a consequence of the available coil inductance L once the motor vehicle ignition has been switched on. Accordingly, mechanically adjusting the steering of the motor vehicle no longer presents a problem for the ensuing rotational angle detection, even if the vehicle battery is shut off.

Upon each full revolution of the shaft 20, the plunger core 30 moves by at least an axial distance D inside the coil 31. To keep the tolerances in conjunction with a required positional or rotational angle resolution as slight as possible, either the coil windings can be placed suitably close together, or the axial adjustment distance of the plunger core 30 via the thread 28 can be selected to be relatively long. The axial distance D therefore also depends on these two parameters. Hence the axial distance D can be in the range of a few millimeters, in the case of coil windings located close together. A further increase in positional resolution is moreover possible by increasing the sampling rate during the measurement of the period length associated with the resonant frequency $f_R$.

In FIG. 3, a second exemplary embodiment of the apparatus 10 of the invention for contactless detection of the rotational angle of the rotatable element 12 is shown. In contrast to FIG. 1, the plunger core is now no longer seated directly on the shaft 20 of the rotatable element 12, but instead on a shaft 36 which is disposed parallel to the shaft 20 and which is driven via a gear 38 that comprises a first pinion 40, mounted on the shaft 20, and a second pinion 42, mounted on the shaft 36. Since the mode of operation of the apparatus 10 of the invention matches that in FIG. 1, it will not be discussed further hereinafter. What is essential in this exemplary embodiment is that the installation space can be reduced compared to the first exemplary embodiment, because of a shorter length of the shaft 20. The stepup ratio of the gear 38 can be adapted to the requirements in terms of the resolution of the rotational angle Θ.

A third exemplary embodiment of the apparatus 10 of the invention is shown in FIG. 4. Unlike FIG. 3, here the shaft 36 is connected in perpendicular fashion to the rotatable element 12 via the gear 38 and the pinions 40 and 42 disposed correspondingly in it. This arrangement assures an even shorter structural form of the shaft 20 and possible adaptation of the device 10 to existing space conditions. Once again, the mode of operation of the apparatus 10 corresponds to that of FIG. 1, so that further explanation is unnecessary.

In closing, it should also be pointed out that the exemplary embodiments show are limited neither to FIGS. 1, 3 and 4, nor to the courses of the sensor signals $S_{M,1}$ and $S_{M,2}$ and of the resonant frequency $f_R$ that results from the sensor signal $S_c$ in FIGS. 2a and 2b. For instance, it is possible in particular, that depending on the resonant circuit 34 used, the material comprising the plunger core 30, the thread 28, and/or the structural form of the coil 31, a nonlinear variation of the resonant frequency $f_R$ relative to the rotational angle Θ or the number U of revolutions can be established. Moreover, still other arrangements between the shafts 20 and 36 and the gear 38 connecting them are conceivable, depending on the space required. In this connection, it should be noted that it is understood that the gear 38 need not include only the two pinions 40 and 42, but instead may comprise a larger number of pinions, pulleys, friction wheels, or the like. Furthermore, it is equally possible that not only the plunger core 30 is moved relative to the coil 31, but the coil 31 may be moved relative to the plunger core 30; that is, the coil 31 is set into motion either alone or in combination with the plunger core 30 via the shafts 20 and 36, respectively, by suitable means, such as pinions and so forth. The apparatus and the method of the invention are not limited to an application in conjunction with an electronic power steering drive but instead can also be used for multiturn rotational angle detection of other rotatable elements.

The foregoing relates to a preferred exemplary embodiment of the invention, it being understood that other variants and embodiments thereof are possible within the spirit and scope of the invention, the latter being defined by the appended claims.

The invention claimed is:

1. An apparatus for contactless detection of the rotational angle of a rotatable element, the apparatus comprising at least one magnetoresistive sensor element which outputs at least one first signal for detecting a rotational angle of the rotatable element in a first range, a driven shaft, a coil and a plunger core relatively moveable in the axial direction of the shaft as a fuction of rotary motion of the shaft, the coil outputting a further signal pertaining to the change in the coil inductance as a result of said axial movement, and means combining the further signal with the first signal unambiguously to detect rotational angles of the rotatable element beyond the first range.

2. The apparatus as defined by claim 1, further comprising a resonant circuit for detecting the position of the plunger core inside the coil, the resonant frequency of the resonant circuit being dependent on the coil inductance.

3. The apparatus as defined by claim 2, wherein the rotatable element is an electronic power steering drive.

4. The apparatus as defined by claim 1, wherein the plunger core is moved relative to the coil via a thread located on the shaft and/or on the plunger core.

5. The apparatus as defined by claim 4, wherein the shaft is a component of the rotatable element.

6. The apparatus as defined by claim 4, further comprising a gear connecting the shaft to the rotatable element.

7. The apparatus as defined by claim 4, wherein the rotatable element is an electronic power steering drive.

8. The apparatus as defined by claim 1, wherein the shaft is a component of the rotable element.

9. The apparatus as defined by claim 8, wherein the rotable element is an electronic power steering drive.

10. The apparatus as defined by claim 1, further comprising a gear connecting the shaft to the rotatable element.

11. The apparatus as defined by claim 10, wherein the rotatable element is an electronic power steering drive.

12. The apparatus as defined by claim 1, wherein the first range includes rotational angles of 0° to 180°.

13. The apparatus as defined by claim 12, wherein the rotatable element is an electronic power steering drive.

14. The apparatus as defined by claim 1 wherein the rotatable element is an electronic power steering drive.

15. The apparatus as defined by claim 1, wherein the magnetoresistive sensor element is an anisotropic, magnetoresistive sensor.

16. A method for contactless detection of the rotational angle of a rotatable element, in which at least one magnetoresisive sensor signal is output by at least one magnetoresistive sensor element for detecting a rotational angle in a first range, the method comprising outputting a coil signal by a coil, which signal describes the variation in the coil inductance upon a rotary motion of a shaft as a consequence of the relative motion between a plunger core and the coil in the axial direction of the shaft, and for unambiguous detection of rotational angles beyond the first range, the coil signal and the at least one magnetoresistive sensor signal are combined.

17. The method as defined by claim 16, further detecting the position of the plunger core inside the coil means of a resonant circuit, whose resonant frequency is dependant on the coil inductance.

18. The method as defined by claim 16, further comprising moving the plunger core relative to the coil via a thread located on the shaft and/or on the plunger core.

19. The method as defined by claim 16, wherein the first range includes rotational angles of 0° to 180°.

\* \* \* \* \*